United States Patent [19]

Pedersen

[11] 4,274,328

[45] Jun. 23, 1981

[54] AUTOMATIC HYDRAULIC SHUT-OFF SYSTEM

[75] Inventor: Carl O. Pedersen, Burlington, Iowa

[73] Assignee: J. I. Case Company, Racine, Wis.

[21] Appl. No.: 57,660

[22] Filed: Jul. 16, 1979

Related U.S. Application Data

[60] Continuation of Ser. No. 803,686, Jun. 6, 1977, abandoned, which is a division of Ser. No. 672,133, Mar. 31, 1976, Pat. No. 4,063,489.

[51] Int. Cl.[3] .................... F15B 13/042; F16K 17/30

[52] U.S. Cl. .................................. 91/445; 137/460; 137/498

[58] Field of Search ................ 91/445, 468; 137/460, 137/498, 596.1, 501

[56] References Cited

U.S. PATENT DOCUMENTS

| | | | |
|---|---|---|---|
| 740,882 | 10/1903 | Locke | 137/460 |
| 820,598 | 5/1906 | Petersen | 137/460 |
| 2,012,351 | 8/1935 | Riney et al. | 137/460 X |
| 2,266,533 | 12/1941 | Brisbane et al. | 137/460 |
| 2,566,773 | 9/1951 | Otis | 137/469 X |
| 3,502,102 | 3/1970 | Maltby | 137/498 |
| 3,587,393 | 6/1971 | Vick | 91/446 |
| 4,004,607 | 1/1977 | Freese | 137/460 X |

*Primary Examiner*—Irwin C. Cohen
*Attorney, Agent, or Firm*—Arthur J. Hansmann

[57] ABSTRACT

An automatic hydraulic shut-off system for use with a hydraulic valve and a work apparatus which is retained under hydraulic pressure even when the hydraulic line is broken inadvertently. A lock valve is connected in the line and senses the loss of hydraulic pressure, and the valve is actuated in response to the pressure drop and retains the work apparatus in a pressurized condition to thereby avoid undesired movement in response to the loss of pressure.

4 Claims, 2 Drawing Figures

AUTOMATIC HYDRAULIC SHUT-OFF SYSTEM

This application is a continuation of Ser. No. 803,686, filed June 6, 1977 and now abandoned, a division of Ser. No. 672,133, filed Mar. 31, 1976, now U.S. Pat. No. 4,063,489.

This invention relates to an automatic hydraulic shut-off system of the type utilized in apparatus which incorporates a hydraulic valve and a working hydraulic motor or piston arrangement, all arranged with a safety mechanism useful in the event the hydraulic line is broken or the hydraulic pressure is reduced inadvertently.

BACKGROUND OF THE INVENTION

The prior art is already aware of safety mechanisms, such as safety controls, for use in hydraulic equipment wherein the hydraulic line is broken or the hydraulic pump is turned off. One such example of a control is shown in U.S. Pat. No. 2,964,016, and that patent is showing apparatus useful in retaining a lifted load in an elevated position even though the hydraulic pressure is inadvertently reduced. The present invention is an improvement upon this type of apparatus, and it accomplishes the arrangement of a hydraulic safety system which is self-actuating and is reliable and operative in the event that the hydraulic pressure is inadvertently reduced, and the lifted load or the like wll not be immediately released in response to the reduced hydraulic pressure.

Another object of this invention is to provide a hydraulic safety system which is simplified in its apparatus and in its installation, and to provide one which can be readily and easily installed in a hydraulic system and is constantly available and is reusable for locking the system in an operative position when the hydraulic pressure is inadvertently reduced, such as by having a hydraulic line break. As such, the present invention provides a fail-safe system, for the purposes mentioned above.

Still further, the present invention provides a hydraulic safety system which is automatically operative, under the conditions and for the reasons mentioned above, and one which can also be manually operated to release it from a locked position wherein the work load is being supported even though the hydraulic line or the like has failed to retain hydraulic pressure. In accomplishing this object, the manual release is arranged so that it can be operated to gradually release the hydraulic pressurizing and sustaining of the lifted load, for instance, and thus the safety lock or like element of this invention provides for automatic safety and also for controlled manual release of same.

Other objects and advantages will become apparent upon reading the following description in light of the accompanying drawings.

DETAILED DESCRIPTION OF THE PREFERRED EMBODIMENT

Figure 1:
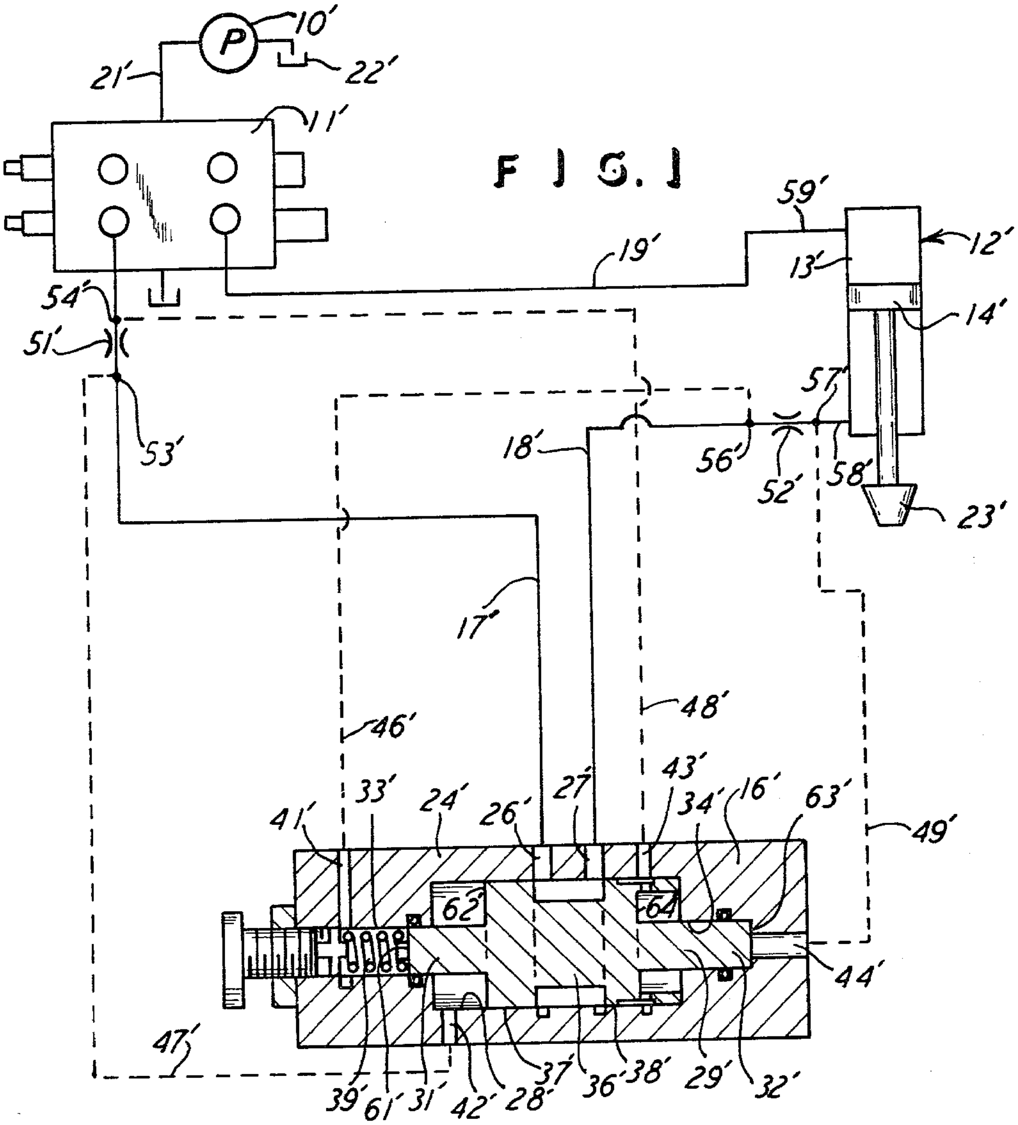
FIG. 1 is a diagrammatic sectional view of this invention.
Figure 2:
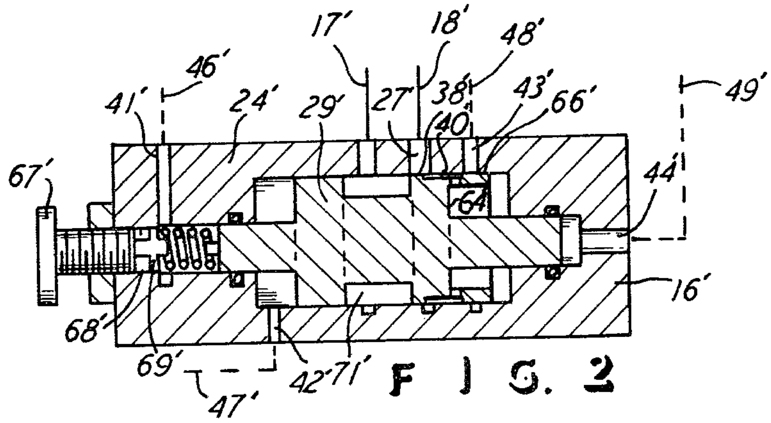
FIG. 2 is a sectional view of one of the elements shown in FIG. 1, but with the element being in a position different from that shown in FIG. 1.

FIGS. 1 and 2 show this is an all-hydraulic embodiment just as in connection with FIG. 5 of the parent application which is now U.S. Pat. No. 4,063,489. The hydraulic system of this invention generally includes a hydraulic pump 10' and an operator controlled hydraulic valve 11' and a hydraulic responsive apparatus 12' which is shown herein to be in the form of a cylinder 13' and a piston 14' forming a cylinder assembly or hydraulic motor, and it shows a hydraulic interlock or safety valve 16'. The aforementioned hydraulic elements are all interconnected by hydraulic lines 17', 18', 19', and 21'. The usual hydraulic reservoir 22' is also shown, and it will be understood that the pump 10' operates between the reservoir 22' and the valve 11' to supply the valve 11' with pressurized hydraulic fluid, and the fluid is then distributed from the valve 11' and to the lines 17', 18', and 19', and thus the desired actuation of the hydraulic responsive apparatus 12' is accomplished. It will further be seen and understood that the apparatus 12' is shown to be supporting a diagrammatically shown and indicated weight 23', and this represents the weight or force exerted downwardly in hydraulically operated apparatus, such as a lifting bucket or a back hoe or a boom or the like. all of which may be mounted on a tractor and be operated by the usual hydraulic apparatus employed in that type of installation, and that will be readily understood by one skilled in the art.

In the aforementioned arrangement, it will be also seen and understood by one skilled in the art that the apparatus 12' is reliant upon a hydraulic pressure in the line 18' in order to maintain the piston 14' and thus the work load 23' in the upwardly supported position. Of course if there is a reduction in the hydraulic pressure in the line 17', then the work load 23' will immediately fall, and it is this contingency and danger that the present invention is arranged to avoid. To do this, the present invention provides the system shown in FIG. 1, and it incorporates the interlock or safety valve 16' which is arranged to immediately respond to the loss of pressure in the hydraulic line 17', and the valve 16' acts to lock and retain the hydraulic pressure in the line 18' to avoid having the load 23' fall.

The safety or lock valve 16' has a housing 24' which has fluid ports 26' and 27' to which the lines 17' and 18', respectively, are connected. Therefore, it will be seen and understood that hydraulic fluid can flow from the valve 11' and through the line 17' and through the ports 26' and 27' and into the line 18' and to the hydraulic apparatus or motor 12', for the desired operation of the apparatus 12'. As mentioned, if there is a failure in the line 17', which is similar to the line 18 of FIG. 1 of U.S. Pat. No. 4,063,489, it is desired that pressure be retained in the apparatus 12' so that the work force, as represented by the weight 23', will not cause the apparatus 12' to move and lose its effort in supporting the weight 23'.

The housing 24' has a chamber 28' in which a movable spool or valve closure 29' is disposed, and the spool 29' can move to the left, as viewed in FIG. 1, in the chamber 28'. Thus, the spool 29' has cylindrical opposite end portions 31' and 32' which are piloted in housing openings 33' and 34', and the spool has an intermediate portion 36' which is snugly slidably disposed in the chamber 28' and actually presents fluid sealing circular surfaces 37' and 38' relative to the cylindrical chamber or bore 28'. A compression spring 39' extends between an end of the housing 24' and the spool portion 31' to urge the spool to the right, as viewed in FIG. 1.

The housing 24' has four more fluid ports 41', 42', 43', and 44'. These ports have hydraulic lines 46', 47', 48', and 49', respectively connected with the four previously mentioned ports, as shown. It will also be seen and understood that the pressurized hydraulic lines 17' and 18' have conventional flow restrictors 51' and 52' respectively disposed in the lines 17' and 18'. Further, it will be seen that the lines 46' through 49' are respectively connected with the lines 17' and 18', and the lines 46' through 49' are shown in dotted lines to most clearly describe them and to distinguish them from the lines 17' and 18' which are actually carrying the working hydraulic fluid. The lines 47' and 48' are shown connected at spaced-apart locations 53' and 54', respectively on the line 17' and on opposite sides of the flow restrictor 51'. Similarly, the lines 46' and 49' are respectively connected at locations 56' and 57' to the line 18' and on opposite sides of the flow restrictor 52'. With this arrangement, under normal operating conditions the fluid flow at the location 58' is the same as the fluid flow at the location 59'. However, if there is a failure in the long and primary line 17', then the quantity of flow at 58' will not be the same as the flow at 59', and the safety interlock valve 16' will sense that variance in flow and will actually cause a shut-off for the line 18' and thereby avoid a loss of the hydraulic pressure in the apparatus 12', all as desired.

To accomplish the aforementioned, it will be seen and understood that the interlock valve spool 29' has two pairs of shoulders or oppositely-faced surfaces 61', 62', 63', and 64'. It will of course be seen and understood that the area 64' is the projected area of the end of the spool 29' minus its projected surface 63', and that area 64' is the same as the area 62', and the area 61' is the same as the area 63'. The arrangement is therefore such that hydraulic fluid presented to the respective areas will cause hydraulic axial balancing of the spool 29'. Accordingly, fluid flow at the restrictors 51' and 52' is in proportion to the pressure differential on opposite fluid-flow sides of the restrictors 51' and 52' such that the fluid pressure at 54' plus the fluid pressure at 57' equals the fluid pressure at 53' plus the fluid pressure at 56'. It will now be noticed that the fluid pressures at 54' and 57' are ported to the right-hand portion of the lock valve 16' and are effective on the spool surfaces 64' and 63'; and the fluid pressures at 53' and 56' are ported to the left-hand side of the lock valve housing 24' and are effective on the spool surfaces 62' and 61'. Accordingly, in normal flow conditions, the spool will be in an equilibrium or shifted position to the right, as seen in FIG. 1, and thus there will be normal flow from the line 17' and through the housing 24' and into the line 18', all as desired.

However, when there is a break in the line 17', or some other failure in the pressure in the line 17', including shutting off of the pump 10', then there will be a reduction in the pressure in the line 47' and in the line 46', and that will cause the spool 29' to shift to the position shown in FIG. 2 where the port 27' is closed by the spool surface 38', except for the groove 40'. The port 43' is then fluid tightly sealed by the circular spool surface 66' which defines the outer circumference of the identified spool shoulder or surface 64', as mentioned. Also, any pressure at 27' goes through groove 40' and is effective on area 64'. With that arrangement, the pressure in the hydraulic line 18' is retained and thus the apparatus 12' cannot move under the force of the load or weight 23', and thereby a safety feature is achieved.

Accordingly, the interlock valve 16' is arranged with its two ports 26' and 27' to connect to the working lines 17' and 18', and it is also arranged with its other ports which are the four ports 41', 42', 43', and 44' which are attached to the sensing hydraulic lines 46' through 49', respectively, and the spool therefore shifts under the change in fluid pressure at the opposite axial end of the spool 29', as seen and as described herein. Also, with the lock valve 16' being located adjacent to the work apparatus 12', as compared to its location relative to the valve 11', the system provides the safety and reacts in response to a break in the longer line 17', all as desired. Further, the fluid restrictors 51' and 52' provide a fluid flow and pressure differential on opposite sides of the respective restrictors, under the conditions mentioned above.

A manual release member 67' is threadedly mounted in an opening 68' in the housing 24', and it has an end 69' which extends toward the spool end portion 31'. When the spool 29' has shifted to its left position in FIG. 2, turning the manual control 67' to move into the housing 24' will cause a shifting of the spool 29' to the right and thereby release the hydraulic interlock or safety condition, if and when such release is desired under the manual control of the manual screw 67' shown in the drawings. Of course when the spool 29' is shifted to the rightward position shown in FIG. 1, then it presents its recessed or passageway portion 71' which conducts the flow between the ports 26' and 27', as desired.

What is claimed is:

1. In an automatic hydraulic shut-off system having a operator controlled directional hydraulic valve unit, a valve housing, a hydraulic responsive apparatus for applying a mechanical force in response to hydraulic pressure applied to said apparatus, a plurality of hydraulic flow lines connected between said housing and said valve unit and said apparatus, the improvement comprising said valve housing having two opposite end portions and a plurality of fluid ports at each of said housing end portions, two fluid ports being adjacent each other in a side wall of said housing and in flow communication with each other and with two of said flow lines being respectively hydraulically connected between said two fluid ports and said valve unit and said apparatus, a fluid-flow restrictor connected in each of said two of said flow lines for restricting flow therethrough, four other of said flow lines being respectively connected between said two flow lines and said housing at four other of said fluid ports, the connection of said four other of said flow lines to said two of said flow lines being in pairs which are located on both sides of each of said restrictors, the said lines of said connections in each of said pairs connected to opposite said housing end portions, a valve closure movably disposed in said housing and exposed to and operative on all said fluid ports and being arranged for flow communication between the said two fluid ports, and said valve closure having a fluid-sealing portion operative relative to said two fluid ports and having four oppositely faced surfaces respectively exposed to said four other fluid ports for moving said closure in said housing in response to a fluid pressure difference at said surfaces, to thereby move said closure fluid-sealing portion to a position to fluid seal said two fluid ports when a break occurs in the flow line between said valve unit and said valve housing.

2. The automatic hydraulic shut-off system as claimed in claim 1, wherein said valve housing is disposed closer to said hydraulic responsive apparatus than to said valve unit, for interrupting the escape of hydraulic fluid from the said line connected between said valve unit and said valve housing.

3. The automatic hydraulic shut-off system as claimed in claim 1, wherein said valve closure consists of a spool having oppositely-faced shoulders which present said four surfaces, and with said shoulders being disposed in fluid-flow communication with said other ports, for end-to-end fluid pressure balancing of said spool and for endwise movement of said spool, all in response to the fluid pressures at said other ports.

4. The automatic hydraulic shut-off system as claimed in claim 3 wherein said spool has a fluid passageway disposed in the spool-shifted position to extend between one of said two ports and one of said oppositely faced surfaces for conducting flow from said one of said two ports and to said one surface and thereby hydraulically hold said spool in the shifted position, said spool in said shifted position blocks the fluid port normally exposed to said one surface.

* * * * *